United States Patent
Zheng

(12) 
(10) Patent No.: US 6,246,813 B1
(45) Date of Patent: Jun. 12, 2001

(54) RELIABLE LOW-COST DUAL FIBER OPTICAL COLLIMATOR

(75) Inventor: Yu Zheng, Sunnyvale, CA (US)

(73) Assignee: JDS Uniphase Corporation, Nepean (CA)

(*) Notice: Subject to any disclaimer, the term of this patent is extended or adjusted under 35 U.S.C. 154(b) by 0 days.

(21) Appl. No.: 09/259,876

(22) Filed: Mar. 1, 1999

(51) Int. Cl.[7] .................................................. G02B 6/32
(52) U.S. Cl. ............................................ 385/34; 385/33
(58) Field of Search ........................................ 385/34, 33

(56) References Cited

U.S. PATENT DOCUMENTS

| | | | |
|---|---|---|---|
| 5,299,272 | * 3/1994 | Buchin | 385/34 |
| 5,456,245 | * 10/1995 | Bornhop | 600/139 |
| 5,546,486 | * 8/1996 | Shih | 385/33 |
| 6,142,678 | * 11/2000 | Cheng | 385/31 |

* cited by examiner

Primary Examiner—Cassandra Spyrou
Assistant Examiner—Leo Boutsikaris
(74) Attorney, Agent, or Firm—Bo-In Lin

(57) ABSTRACT

The present invention discloses a method to fabricate an improved dual fiber optical collimator. The method includes the steps of a) Inserting a GRIN lens into and held by a first short glass tube 110 and inserting a dual fiber pigtail 130 into and held by a second short glass tube 115. b) Adjusting the position of the GRIN lens 105 relative to the dual fiber pigtail 130 on an alignment stage to achieve a lowest transmission loss. c) Adjusting the positions of the glass tubes 110 and 115 by moving them toward center so that their end surfaces are in contact with each other. d) Fixing the fiber pigtail 130, the GRIN lens 105 and the glass tubes 110 and 115 together by applying a heat curing epoxy 135. e) Permanently fixing the fiber pigtail 130 to a long glass tube 140 by applying a heat curing epoxy 150. And, f) permanently fixing the glass tube 140 to a stainless steel holder 145 by applying a heat curing-epoxy 150.

20 Claims, 5 Drawing Sheets

Improved Dual-Fiber Optical Collimator

Previously Improved Dual-Fiber Optical Collimator

Short Glass Tube

RELIABLE LOW-COST DUAL FIBER OPTICAL COLLIMATOR

FIELD OF THE INVENTION

This invention relates generally to a method and system for use in optical fiber technology. More particularly, this invention relates to a method and system for manufacturing an improved dual fiber optical collimator.

BACKGROUND OF THE INVENTION

As optical fiber technology is being more broadly applied in the telecommunications, data communications and CATV industries, the fiber optic component industry is now confronted with increasing requirements for good performance and high reliability of fiber optic components. In particular, the optical components are required to maintain substantially constant performance characteristics and reliability under wide ranges of temperature variations. High humidity resistance is also required. Currently, most of in-line fiber optic components are designed and manufactured based on optical collimators which provide low-loss light transmission from the input fiber to the output fiber through an optical element. As a basic building block of the fiber optic components, the reliability and level of performance of the fiber optic components depend heavily on the reliability and the performance characteristics of the optical collimators. Dual fiber optical collimators are one type of collimators widely employed in making the fiber optic components. For example, the dual fiber optical collimators are employed to make thin film filter based wavelength division multiplexers and hybrid optical isolators.

FIG. 1A shows the structure of a typical dual fiber optical collimator that includes a dual fiber pigtail 30, a GRIN lens 15, a glass tube 40 and a stainless steel holder 50. In a typical manufacturing process, the relative position of the GRIN lens 15 to the fiber pigtail 30 is adjusted to achieve a lowest transmission loss from the input fiber 20 to output fiber 25. The GRIN lens 15 and the dual fiber pigtail 30 are fixed together by applying an ultraviolet (UV) curing epoxy 35. Then the fiber pigtail 30 is fixed to a glass tube 40 by applying an UV curing epoxy 45 and the glass tube 40 is fixed to a stainless steel holder 50 by a heat curing epoxy 55. The typical method and system provides the dual fiber optical collimators with fair performance and reliability suitable for some types of applications. However, the dual fiber optical collimators manufactured with the conventional processes often fail and perform poorly when they are implemented in fiber optic components that demand long term operation in a high temperature, e.g., 85° C., and high humidity, e.g., 85% humidity, environment. The UV curing epoxy bonding, e.g., epoxy 35, is often broken when subject to such operation conditions and then optical signal transmission becomes very poor. Thus, further development and reliable fiber optic components with high level of performance is limited to these difficulties. In a pending patent, entitled ※ Dual Fiber Optical Collimator※, filed recently by the present inventor, improvements are achieved for the reliability of the dual fiber optical collimators. In the improved manufacturing process as shown by FIG. 1B, for the pending application, the GRIN lens 15 and the dual fiber pigtail 30 are first sealed by applying tiny amount of an ultraviolet (UV) curing epoxy 35. After the relative position of the GRIN lens 15 to the fiber pigtail 30 is adjusted to achieve a lowest transmission loss from the input fiber 20 to output fiber 25, the GRIN lens 15 and the fiber pigtail 30 are fixed together by applying a heat curing epoxy 40. Since heat-curing epoxy bonding is much stronger than UV curing epoxy bonding, the improved dual fiber optical collimators have much better reliability as compared to the typical ones. However, due to the use of sealing UV curing epoxy, the dual fiber optical collimators, even with improved reliability, still cannot fully meet the more stringent application requirements. The small quantity UV epoxy often causes reliability problems due to an observed characteristic that the performance of UV curing epoxy demonstrates too much temperature dependence. Further reliability concerns are caused by the fact that the UV curing epoxy has low humidity resistance. Thus, the improved dual fiber optical collimators can only prove a partial solution.

Therefore, a need still exists in the art of design and manufacturing of the dual fiber optical collimators to provide new material compositions, device structure, and manufacturing processes to overcome the difficulties discussed above. Specifically, a technique to provide the collimators without use of any UV curing epoxy is required. Since production costs have been an important factor prohibiting practical implementation of fiber optical technology, it is also highly desirable that the cost of such technology would be as low as possible.

SUMMARY OF THE PRESENT INVENTION

It is therefore an object of the present invention to provide a new design and process for fabricating a dual fiber optical collimator with improved temperature dependence and humidity resistance. Therefore, the aforementioned difficulties and limitations in the prior arts can be overcome.

Specifically, it is an object of the present invention to provide a design and process to fix a dual fiber pigtail to a GRIN lens by applying only the heat curing epoxy. Two short glass tubes are used to prevent the heat curing epoxy from contaminating the central optical path. As a result, the need for using UV curing epoxy is eliminated according to the new method and configuration of the dual fiber optical collimators of this invention. The collimators produced according to the presently improved design and process have significantly minimized the temperature dependence of collimator performance and increased the humidity resistance. Therefore, the collimators of this invention can be employed in fiber optic components for broaden applications without being limited by the performance and reliability problems of the collimators as that encountered in the prior arts.

Briefly, in a preferred embodiment, the present invention discloses a dual fiber optical collimator. The collimator includes a dual fiber pigtail disposed at a gap distance from a GRIN lens with the gap distance adjusted for achieving a lowest transmission loss. The collimator further includes two short glass tubes. The fiber pigtail is inserted into and held by the first glass tube and the GRIN lens is inserted into and held by the second glass tube. The fiber pigtail, the GRIN lens and the short glass tubes are fixed together by a first heat curing epoxy. The collimator further includes a long glass tube containing and fixing the fiber pigtail in the long glass tube with a second heat curing epoxy. The collimator further includes a stainless steel holder containing and permanently fixing the long glass tube by a third heat curing epoxy. In a preferred embodiment, the short glass tubes have a length of about 2 mm, an outer diameter of about 2.8 mm, and an inside diameter as the same as those of the fiber pigtail and the GRIN lens. In another preferred embodiment, the first heat curing epoxy for fixing the fiber pigtail, the GRIN lens and the short glass tubes is the 353ND epoxy. In another preferred embodiment, the GRIN lens is a GRIN lens of 0.23 pitch.

The present invention further discloses a method to fabricate an improved dual fiber optical collimator. The method includes the steps of: a) Inserting a GRIN lens into a short glass tube and a dual fiber pigtail into another short glass tube; b) adjusting the position of the GRIN lens relative to the dual fiber pigtail on an alignment stage to achieve a lowest transmission loss; c) adjusting the positions of the two short glass tubes so that their end surfaces are in contact with each other; d) fixing the fiber pigtail, the GRIN lens and the two short glass tubes together by applying a heat curing epoxy; e) permanently fixing the fiber pigtail to a long glass tube by applying a heat curing epoxy; f) permanently fixing the long glass tube to a stainless steel holder by applying a heat curing epoxy.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
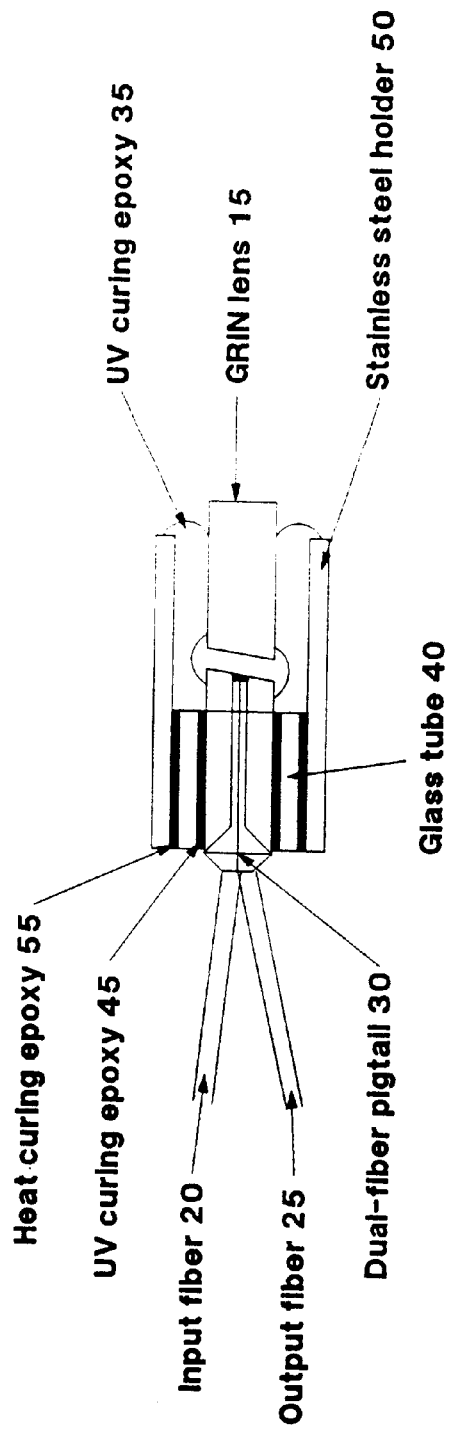
FIG. 1A is a cross sectional view of a conventional dual fiber optical collimator.
Figure 1B:
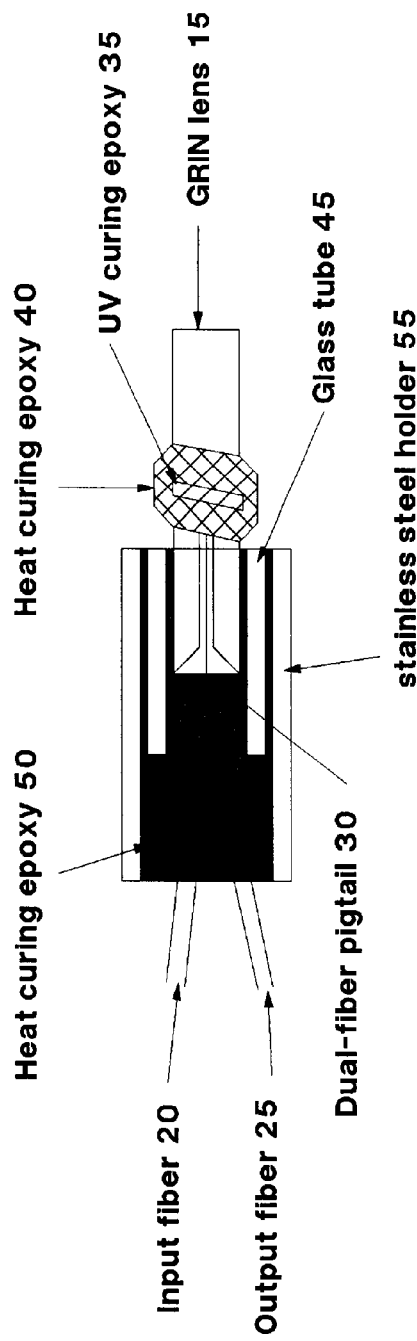
FIG. 1B is a cross sectional view of a previously improved dual fiber optical collimator.
Figure 2:
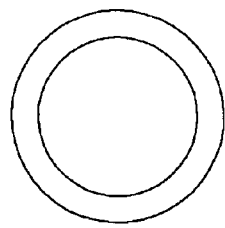
FIG. 2 is a cross sectional view of a short glass tubes of this invention.
Figure 2:
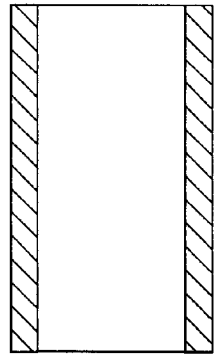

In the present invention, the fiber pigtail is fixed to the GRIN lens by applying a heat curing epoxy only. Application of UV curing epoxy as that commonly practiced in the prior art is eliminated. First, a GRIN lens is inserted into a first short glass tube. The first glass tube has an inner diameter slightly larger than the outer diameter of the GRIN lens and therefore can freely slide along the GRIN lens without moving the GRIN lens. And, a fiber pigtail is inserted into and held by a second short glass tubes. The second glass tube also has an inner diameter slightly larger than the outer diameter of the fiber pigtail and therefore can freely slide along the fiber pigtail without moving the fiber pigtail. Then the relative position of the GRIN lens to the fiber pigtail is adjusted on an optical stage to achieve a lowest transmission loss from the input fiber to output fiber. Then the first and the second short glass tubes are moved toward the center by sliding along the GRIN lens and the pigtail respectively without changing their relative position to each other. The first and the second short glass tubes are moved to the center until their end-surfaces are in contact with each other. Then a heat curing epoxy is applied. The heat epoxy permeates the interface area between the GRIN lens and the first short glass tube thus securely attaching them together. The heat epoxy also permeates the interface areas between the second short glass tube and the fiber pigtail thus securely attaching them together. And, the heat epoxy further permeates the interface areas between the first and the second short glass tubes thus securely attaching them together. Thus, the fiber pigtail, the GRIN lens and the two short glass tubes are fixed together by the heat curing epoxy permeating the interfaces areas between these elements. A 353ND heat-curing epoxy for Epoxy Technology Inc., a company located in Billerica, Mass. is used. By assembly an optical collimator according to the above configuration, a GRIN lens of 0.23 pitch is implemented in the present invention to provide an optimal gap between the GRIN lens and the pigtail at a distance of about 0.2 mm. Because of the surface tension of heat curing epoxy over the interface areas, the heat curing epoxy is prevented from spreading over the interface areas to enter into optical path. Contamination of the optical path is prevented in this collimator. In the present invention, the length of the short glass tubes is chosen as about 2 mm. The inside diameter of the short glass tubes is chosen to match those of the fiber pigtail and GRIN lens, i.e., 1.8 mm. The outside diameter of the short glass tubes is chosen as about 2.8 mm. FIGS. 2A and 2B show a top view and a cross sectional view respectfully of a glass tube discussed above. By making use of the short glass tubes as shown in FIGS. 2A and 2B, an improved method and system of design and manufacturing of the dual fiber optical collimators are therefore disclosed in this invention.

Figure 3A:
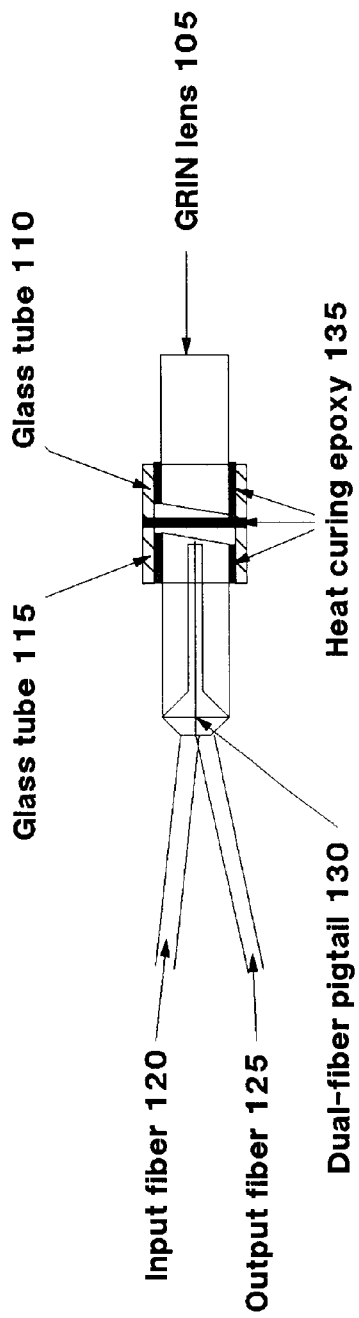
FIG. 3A is a cross sectional view of an improved dual fiber optical collimator of this invention in assembly.
Figure 3B:
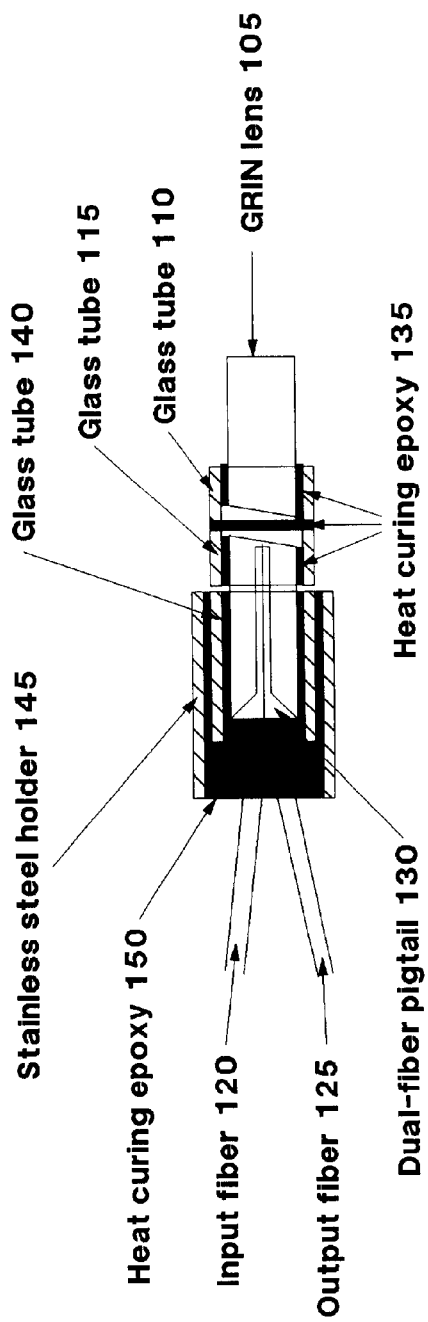
FIG. 3B is a cross sectional view of a final improved dual fiber optical collimator of this invention.

Please refer to FIGS. 3A to 3B for discussion of the materials employed and the fabrication processes applied to provide an improved dual fiber collimator 100 of this invention. In FIG. 3A, a GRIN lens 105 is inserted into and held by a first short glass tube 110. Then a dual fiber pigtail 130 is inserted onto and held by a second short glass tube 115. Then the GRIN lens 105, the fiber pigtail 130 held by the first and the second glass tubes 110 and 115 are mounted on an alignment stage (not shown). The distance and orientation of the fiber pigtail 130 relative to the GRIN lens 105 are aligned and adjusted until a lowest transmission loss from the input fiber 120 to output fiber 125 is achieved. After the fiber pigtail 130 is placed at its optimal position relative to the GRIN lens 105, the positions of the two glass tubes 110 and 115 are sledded to the center until the end surfaces of the first and the second short glass tubes are in contact. The first and the second short glass tubes 110 and 115 have an inner diameter slightly larger than the outer diameter of the GRIN lens 105 and the fiber pigtail 130. Therefore, the first and the second short glass tubes 110 and 115 can slide along the GRIN lens 105 and the fiber pigtail 130 without disturbing the distance and orientation of the GRIN lens 105 and the fiber pigtail 130. After the end surfaces of the first and the second short glass tubes 110 and 115 are in contact with each other, a 353ND epoxy 135 is applied to the interface areas between the first and second short glass tubes 110 and 115. The 353ND epoxy 135 is also applied at the interface areas between the GRIN lens 105 and the first short glass tube 110 and the interface areas between the second short glass tube 115 and the pigtail 130. Because of the strong surface tension generated between the glass tube surface and the epoxy 135, the epoxy 135 will gradually diffuse until it permeates all the interface areas. The epoxy therefore spreads over all interface-areas between the end surfaces of the short glass tubes 110 and 115. And, the epoxy 135 diffuses into and permeates all the interface areas between the short glass tubes and the GRIN lens and the pigtail. Because of the surface tension, the 353ND epoxy 130 will not contaminate optical paths of the GRIN lens 105 and fiber pigtail 130. The epoxy will only diffuse over all contact areas between the glass tube 110 and the GRIN lens 105, and the interface areas between the glass tube 115 and the fiber pigtail 130 and between the two glass tubes 110 and 115. As a result, the bonding between the fiber pigtail 130 and the GRIN lens 105 is significantly increased as compared to the prior arts.

In FIG. 3B, the fiber pigtail 130 is fixed to a glass tube 140 by a heat curing epoxy 150, such as the 353ND epoxy, and the glass tube 140 is fixed to a stainless steel holder 145 by a heat curing epoxy 150, such as the 353ND epoxy. FIG. 3B shows the finally assembled dual fiber optical collimator. The performance and reliability of the collimators are significant improved as compared to the prior arts. Typical temperature dependence of insertion loss of the collimators has been improved from about 0.12 dB in the prior arts to less than 0.05 dB in the present invention. The improvement is achieved within temperature range of 0–80° C. High temperature/humidity resistance has also been improved from about 350 hours in the prior arts to more than 2500 hours in the present invention.

According to the above descriptions, this invention discloses a dual fiber optical collimator. The collimator includes a dual fiber pigtail 130 disposed at a gap distance from a GRIN lens 105 with the gap distance adjusted for achieving a lowest transmission loss. The collimator 100 further includes a first short glass tube 110 holding the GRIN lens 105, and a second short glass tube 115 holding the fiber pigtail 130. The collimator further includes a first epoxy 135 spreading over an interface area between the first short glass tube 110 and the GRIN lens 105. The first epoxy 135 further spreads over an interface area between the second short glass tube 115 and the fiber pigtail 130. The first epoxy 135 further spreads over an interface area between an end surface of the first short glass tube 110 and an end surface of the second short glass tube 115. The first epoxy 135 thus securely fixes the first and the second short glass tubes 110 and 115 and the GRIN lens 105 and the fiber pigtail 130. The collimator 100 further includes a long glass tube 140 containing and fixing the fiber pigtail in the glass tube 140 with a second heat curing epoxy 150. The collimator 100 further includes a stainless steel holder 145 containing and permanently fixing the glass tube 140 by a third heat curing epoxy 150. In a preferred embodiment, the lengths of the first and the second short glass tubes 110 and 115 are chosen as about 2 mm. Their inside diameters are chosen to match those of the fiber pigtail 130 and GRIN lens 105, i.e., 1.8 mm. Their outside diameters are chosen as about 2.8 mm. In another preferred embodiment, the first heat curing epoxy 135 for fixing the fiber pigtail 130, the GRIN lens 105 and the glass tubes 110 and 115 is a 353ND epoxy. In another preferred embodiment, the GRIN lens 105 is a GRIN lens of 0.23 pitch.

In summary, this invention discloses a fiber optical collimator 100. The collimator 100 includes a fiber pigtail 130 and a GRIN lens 105 disposed from each other with a gap distance adjusted for achieving a lowest transmission loss. The collimator further includes a first and a second short glass tubes 110 and 115 holding the GRIN lens 105 and the fiber pigtail 130 respectively. The collimator further includes a heat curing epoxy 135 permanently fixing the fiber pigtail 130, the GRIN lens 105 and the first and the second glass tubes 110 and 115 together.

According to the configuration of this invention, the first and the second short glass tubes can be combined into a single holding tubes. The GRIN lens and the dual fiber pigtail can be inserted into the holding tubes. The gap between the GRIN lens and the pigtail can then be adjusted on an alignment stage. In summary, this invention discloses a fiber optical collimator. The collimator includes a short holding tube. The collimator further includes a fiber pigtail and a GRIN lens held by the short holding tube and disposed from each other with a gap distance adjusted for achieving a lowest transmission loss. The collimator further includes a heat curing epoxy permanently fixing the fiber pigtail, the GRIN lens and the holding tube together.

This invention further discloses a method for fabricating a dual fiber optical collimator. The method includes the steps of a) employing a holding tube for holding a fiber pigtail and a GRIN lens maintained at an adjusted optimal position; and b) permanently fixing the fiber pigtail, the grin lens and the holding tube together by applying a heat curing epoxy.

According to FIGS. 3A to 3B and the above descriptions, this invention discloses a design and method of manufacturing a dual fiber optical collimator. The manufacture method comprises steps of a) Inserting a GRIN lens into and held by a first short glass tube 110 and inserting a dual fiber pigtail 130 into and held by a second short glass tube 115. b) Adjusting the position of the GRIN lens 105 relative to the dual fiber pigtail 130 on an alignment stage to achieve a lowest transmission loss. c) Adjusting the positions of the glass tubes 110 and 115 by moving them toward center so that their end surfaces are in contact with each other. d) Fixing the fiber pigtail 130, the GRIN lens 105 and the glass tubes 110 and 115 together by applying a heat curing epoxy 135. e) Permanently fixing the fiber pigtail 130 to a long glass tube 140 by applying a heat curing epoxy 150. And, f) permanently fixing the glass tube 140 to a stainless steel holder 145 by applying a heat curing epoxy 150.

Therefore, the present invention discloses a new design and process for fabricating a dual fiber optic collimator with improved performance and reliability. The difficulties and limitations in the prior arts are overcome. Specifically, this invention discloses a fabrication process to fix the position of a fiber pigtail relative to a GRIN lens by applying only a heat curing epoxy to produce collimators with better temperature dependence and humidity resistance. Two short glass tubes are used to prevent the heat curing epoxy from contaminating the central optical paths. Therefore, the improved collimators can be employed in fiber optic components for broaden applications without being limited by the performance and reliability problems of the collimators as that encountered in the prior arts.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for fabricating a dual fiber optical collimator comprising steps of
   a) inserting a GRIN lens into a first short holding tube and a dual fiber pigtail into a second short holding tube;
   b) adjusting a relative position of said dual fiber pigtail to said GRIN lens on an alignment stage to an optimal position achieving a lowest transmission loss;
   c) sliding said first short holding tube along said GRIN lens toward said dual fiber pigtail without moving said GRIN lens and meanwhile sliding said second short holding tube toward said GRIN lens without moving said dual fiber pigtail until said first and second short holding tubes are in contact;
   d) permanently fixing said fiber pigtail, said GRIN lens and said first and second short holding tubes together by applying a first heat curing epoxy;
   e) permanently fixing said fiber pigtail to a glass tube by applying a second heat curing epoxy; and f) permanently fixing said glass tube to a stainless steel holder by applying a third heat curing epoxy.

2. The method for fabricating a dual fiber optical collimator of claim 1 wherein:

said step a) of inserting said GRIN lens into said first short holding tube and inserting said dual fiber pigtail into said second short holding tube is a step of inserting said GRIN lens into a first short holding tube and inserting said dual fiber pigtail into said second short holding tube having a length of about 2 mm, having an inner diameter of about 1.8 mm and outer diameter of about 2.8 mm.

3. The method for fabricating a dual fiber optical collimator of claim 1 wherein:

said step a) of inserting said GRIN lens into said first short holding tube and inserting said dual fiber pigtail into said second short holding tube is a step of inserting said GRIN lens into a first short glass tube and inserting said dual fiber pigtail into a second short glass tube.

4. The method for fabricating a dual fiber optical collimator of claim 1 wherein:

said step d) of permanently fixing said fiber pigtail, said GRIN lens and said first and second short holding tubes together by applying a heat curing epoxy is a step of applying a heat curing 353ND epoxy.

5. The method for fabricating a dual fiber optical collimator of claim 1 wherein:

said step b) of adjusting a relative position of a dual fiber pigtail to a GRIN lens on an alignment stage is a step of adjusting said relative position of a dual fiber pigtail to a GRIN lens of 0.23 pitch.

6. A method for fabricating a fiber optical collimator comprising steps of a) employing a first holding tube for holding a fiber pigtail and a second holding tube for holding a GRIN lens maintained at an adjusted optimal relative position; and b) sliding said first holding tube and said second holding tube to touch each other without changing said adjusted optimal relative position and permanently fixing said fiber pigtail, said GRIN lens and said first and second holding tubes together by applying a heat curing epoxy.

7. The method for fabricating a fiber optical collimator of claim 6 wherein:

said step a) of employing a first holding tube for holding a fiber pigtail and a second holding tube for holding a GRIN lens is a step of inserting said GRIN lens into a first holding tube and said fiber pigtail into a second holding tube wherein said first and second holding tubes have a length of about 4 mm, and have an inner diameter of about 1.8 mm and outer diameter of about 2.8 mm.

8. The method for fabricating a fiber optical collimator of claim 6 wherein:

said step a) of employing a first holding tube for holding a fiber pigtail and a second holding tube for holding a GRIN lens is a step of inserting said GRIN lens into a first glass tube and said fiber pigtail into a second glass tube.

9. The method for fabricating a fiber optical collimator of claim 6 wherein:

said step b) of permanently fixing said fiber pigtail, said GRIN lens and said first and second holding tubes together by applying said a heat curing epoxy is a step of applying a heat curing 353ND epoxy.

10. The method of fabricating a fiber optical collimator of claim 6 wherein:

said step a) of inserting a GRIN lens into said first holding tubes is a step of inserting a GRIN lens of 0.23 pitch.

11. A dual fiber optical collimator comprising:

a dual fiber pigtail disposed at a gap distance from a GRIN lens with said gap distance adjusted for achieving a lowest transmission loss;

a first short holding tube holding said GRIN lens and a second short holding tube holding said dual fiber pigtail wherein said first short holding tube are in contact with said second short holding tube a first heat curing epoxy fixing said GRIN lens, said dual fiber pigtail and said first and second short holding tubes together;

a glass tube containing and fixing said fiber pigtail in said glass tube with a second heat curing epoxy; and a stainless steel holder containing and permanently fixing said glass tube by a third heat curing epoxy.

12. The dual fiber optical collimator of claim 11 wherein:

said first and said second holding tubes are holding tubes each having a length of about 2 mm, having an inner diameter of about 1.8 mm, and having an outer diameter of about 2.8 mm.

13. The dual fiber optical collimator of claim 11 wherein:

said first and second short holding tubes are glass holding tubes.

14. The dual fiber optical collimator of claim 11 wherein:

said first heat curing epoxy for fixing said fiber pigtail, said GRIN lens and said first and second holding tubes is a heat curing epoxy of 353ND epoxy.

15. The dual fiber optical collimator of claim 11 wherein:

said GRIN lens is a GRIN lens of 0.23 pitch.

16. A fiber optical collimator comprising:

a first and a second holding tubes;

a fiber pigtail held by said first holding tube and a GRIN lens held by said second holding tube and disposed from each other with a gap distance adjusted for achieving a lowest transmission loss;

a heat curing epoxy permanently fixing said fiber pigtail, said GRIN lens and said first and said second holding tubes together.

17. The fiber optical collimator of claim 16 wherein:

said first and second holding tubes having a length of about 4 mm, having an inner diameter of about 1.8 mm outer diameter of about 2.3 mm.

18. The fiber optical collimator of claim 16 wherein:

said first and second holding tubes are a first and a second glass holding tubes.

19. The fiber optical collimator of claim 16 wherein:

said heat curing epoxy is a heat curing epoxy of 353ND epoxy.

20. The fiber optical collimator of claim 16 wherein:

said GRIN lens is a GRIN lens of 0.23 pitch.

* * * * *